Jan. 10, 1939.   H. B. BESSAC   2,143,257
PLANT PROTECTOR
Filed Feb. 19, 1937
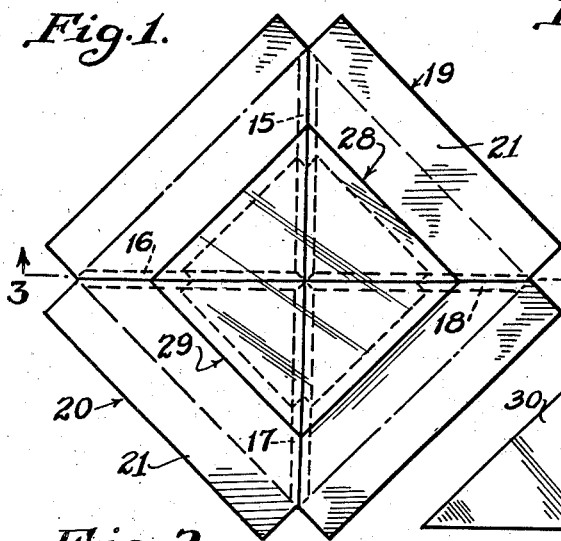
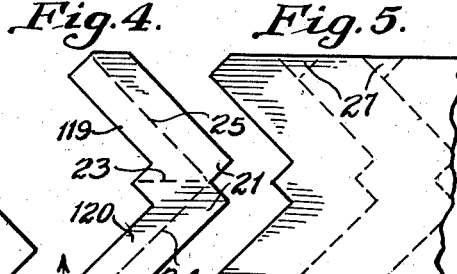
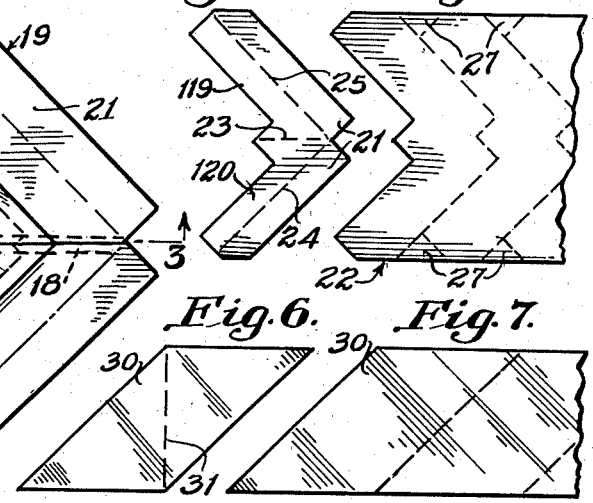
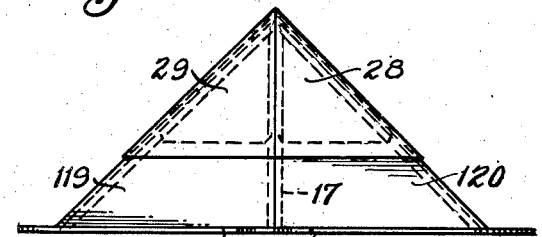
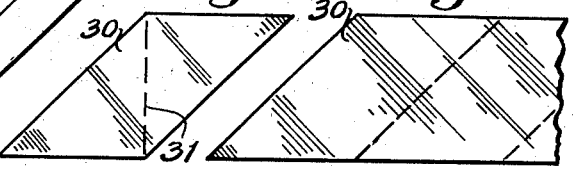
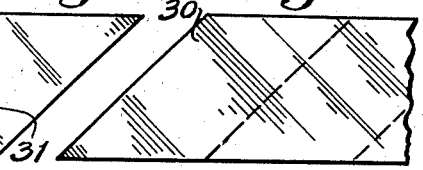
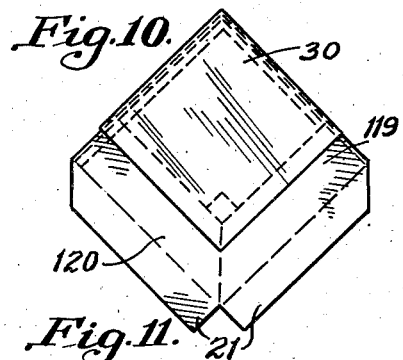
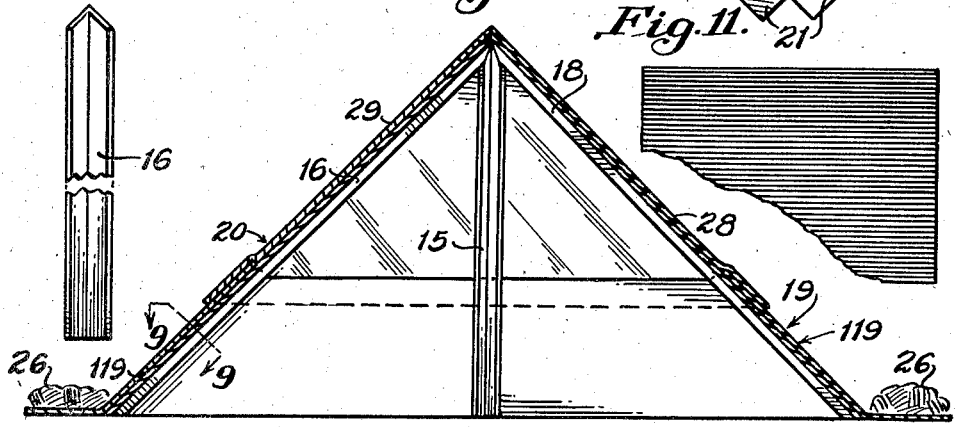
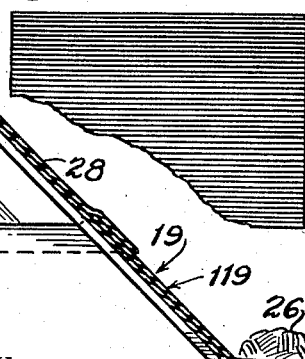
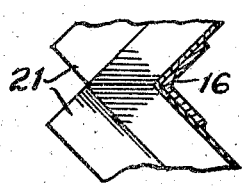
INVENTOR
× Henri B. Bessac Patented Jan. 10, 1939

2,143,257

UNITED STATES PATENT OFFICE 2,143,257

PLANT PROTECTOR

Henri B. Bessac, Glen Ranch, Calif., assignor to Hamilton C. Chase, Los Angeles, Calif.

Application February 19, 1937, Serial No. 126,694

2 Claims. (Cl. 47—29)

This invention relates to improvements in plant protectors, and the principal object is to provide plant protectors that are relatively strong and durable in use and can be handled repeatedly without the parts breaking or separating. To that end my plant protectors are formed of material that will not easily deteriorate so that the parts adjacent to or in contact with the ground will not rot and thereby prevent the protectors from being again handled after being placed in use.

As is well known, the seed of early tender plants are placed in hills and covered with the protectors that remain on the hills until the seeds have sprouted and the plants grown to a size in which it is necessary to remove the protectors to thin out the plants to the number that are to remain in the hill. During this period of plant growth if the weather has been damp the protectors, such as have heretofore been made, will have rotted so they cannot be removed and replaced for protecting the remaining plants and just at a period in which the plants need the most protection.

As stated, an object of this invention is to provide plant protectors that can be used for long periods of time without deteriorating, and which can be placed on the hills at the time of planting, removed for plant thinning, and placed back on the hills in practically as good condition as when first placed in use.

Another object of this invention is to provide plant protectors each of which, when erected and in use, is in the form of a miniature hot house adapted to maintain a relatively uniform atmospheric condition around the plant, as well as providing it with sufficient light and shade to enhance its growth. In other words the enclosure maintains a relatively even temperature therein, and the semi-transparent top admits light, while the bottom portion of the protector with its earth-covered anchor flaps affords shade to retain the natural moisture in the soil adjacent to and surrounding the spreading roots of the plant.

A feature of invention is shown in constructing each plant protector so it is in the form of a four-sided tent, with the adjacent edges of its sides hinged together so it can be folded down flat and with others can be stacked into compact packages for handling, shipping and storage; and also that in use it is exceedingly easy to open and erect, and easy to fold and pack again after its use in the field has terminated.

Another feature of invention is shown in forming my four-sided plant protector with a semi-transparent top portion arranged above an opaque bottom portion and with the adjacent edges of the sides connected by elongated cardboard hinges; and with each side provided with integral anchor flaps by which the plant protector can be securely anchored over a seeded hill.

Another feature of invention is shown in the provision of the stamped-out parts of my plant protectors whereby practically all of the material used in forming them is utilized without waste.

Other objects, advantages and features of invention may appear from the accompanying drawing and detailed description thereof.

The accompanying drawing illustrates my invention, in which:

Figure 1 is a plan view of a plant protector that is constructed in accordance with my invention.

Fig. 2 is a side elevational view of the plant protector shown in Fig. 1.

Fig. 3 is an enlarged section on line 3—3 of Fig. 1 with the material used in the sides greatly exaggerated as to thickness.

Fig. 4 is a plan view of a blank from which two of the bottom sides of the plant protector are formed, together with their integral anchor flaps.

Fig. 5 is a fragmental portion of the material from which the blank shown in Fig. 4 is stamped, with the dotted lines indicating the lines on which the material is cut.

Fig. 6 is a plan view of a blank that forms two of the transparent top sides of the plant and indicating by dots the line on which the top blank is folded.

Fig. 7 is a fragmental portion of the semi-transparent material from which the top of the plant protector is formed, indicating by dots the lines on which the blanks are cut from the material.

Fig. 8 is a fragmental inside view of one of the narrow elongated card-board hinges that are used to pivotally connect the adjacent side edges of the plant protector.

Fig. 9 is a fragmental section on the line 9—9 of Fig. 3, showing one of the hinges in use.

Fig. 10 is a plan view of my plant protector in a folded position.

Fig. 11 diagrammatically shows a number of my plant protectors folded and stacked in a pile.

My plant protector includes four supports 15, 16, 17 and 18 which, in addition to supporting the structure, also function as narrow elongated hinges that enable the protectors to be folded and stacked in piles when not in use; and when erected for use these supports are spaced an equal distance apart and are inclined upwardly and inwardly until their top ends touch at a common center.

Blanks 19 and 20 that are formed of rot-proof material are secured to the lower end portions of the combined supports and hinges so they form a four-sided enclosure with each blank forming two of the sides. These blanks are secured to the supports by water-proof paste and are arranged so their integral anchor flaps 21 will lie flat on the ground when the protector is erected, and, as best shown in Fig. 1, there is an anchor flap 21 to each of the sides.

The form of the blanks 19 and 20 is best shown in Figs. 4 and 5 and as seen therein the blanks are stamped out of a sheet of rot-proof material 22 with the sides 119 and 120 integral at the dotted folding line 23, and also integral with their respective anchor flaps 21 that are hinged to the sides by folding them on the dotted lines 24 and 25 so that when in use the flaps will lie flat on the ground so they can be covered with dirt 26 to anchor them down as semi-diagrammatically shown in Fig. 3.

As indicated in Fig. 5, the blanks 19 and 20 are cut from the sheet 22 with the waste material being limited to the small triangular strip 27 at opposite edges of the sheet 22.

The top of the plant protector is formed from two blanks 28 and 29 that are stamped out of a sheet of semi-transparent material 30 that is water-proof, and the shape of these blanks is shown in Fig. 6.

Each of the blanks 28 and 29 is bent on the dotted line 31 so that they each form two of the top parts of the four-sided protector, and are secured to the top portions of the supports 15, 16, 17 and 18 so these semi-transparent sides complete the enclosure to thereby form a miniature hothouse that will protect a plant from the unfavorable climatic conditions hereinbefore mentioned.

As best shown in Fig. 7, the blanks 28 and 29 are cut from the sheet of semi-transparent material 30 without any waste.

As shown in Figs. 10 and 11, my plant protectors are shaped, constructed and assembled so that after being manufactured and ready for use they can be folded down flat and then piled one on another into a suitable package for handling, storage and shipping.

The supports are formed of thin flexible sheet material such as cardboard that has been treated to render them waterproof and free from excessive deterioration when in use in a field, and they are relatively narrow and each folded on itself so it is in the form of an elongated hinge that is strong enough to support the protector through heavy storms and strong winds, and which also is flexible enough to readily yield when the protector is to be folded and packed and opened when placed in use.

In use my plant protector is taken in a flat form from a stacked pile and after being opened is placed over a planted hill and anchored thereon by loading the anchor flaps 21 with sufficient earth to hold the protector in place for a relatively long time, or until the seed has sprouted in the hill and grown to a size in which it is necessary to thin the plants.

At thinning time the protector is lifted from the hill and then replaced after the plants have been thinned to continue protecting those that have been left in the hill; and they remain in place until danger of frost and unfavorable weather conditions have passed, after which they are removed from the hills and stacked into packages ready for storage or otherwise, and as they are formed of material that is relatively strong and water-proof they can be used repeatedly for the purpose described.

What I claim is:

1. A plant protector including card-board supports in the form of narrow elongated hinges inclined upwardly and inwardly until their top ends touch at a common center, a pair of blanks formed of opaque water-proof material secured to the lower portions of said supports so they form a four-sided enclosure, a pair of blanks formed of semi-transparent material secured to the upper portions of said supports so they complete the four-sided enclosure, means for anchoring said protector to the ground over a plant or seeded hill, said parts constructed and arranged so that said protector can be folded down flat for the purpose specified.

2. A plant protector including card-board supports in the form of narrow elongated hinges inclined upwardly and inwardly until their top ends touch at a common center, a pair of blanks formed of opaque water-proof material secured to the lower portions of said supports so they form a four-sided enclosure with anchor flaps integral therewith, a pair of blanks formed of semi-transparent material secured to the upper portions of said supports so they complete the sides of said enclosure and over-lap a portion of the opaque sides, said parts formed and secured together so that said plant protector can be folded down flat for the purpose specified.

HENRI B. BESSAC.